(12) United States Patent
Yarmchuk

(10) Patent No.: US 6,344,942 B1
(45) Date of Patent: Feb. 5, 2002

(54) METHOD AND APPARATUS FOR ABSOLUTE TRACK SPACING DETERMINATION FOR SELF-SERVOWRITING

(75) Inventor: Edward John Yarmchuk, Mahopac, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/116,857

(22) Filed: Jul. 16, 1998

(51) Int. Cl.[7] ............................................. G11B 21/02
(52) U.S. Cl. ...................................... 360/75; 360/78.04
(58) Field of Search ........................ 360/51, 52, 78.09, 360/78.12, 75, 78.05, 77.08, 78.04; 318/254, 439

(56) References Cited

U.S. PATENT DOCUMENTS

| | | | | |
|---|---|---|---|---|
| 4,414,589 A | * | 11/1983 | Oliver et al. | 360/77 |
| 4,531,167 A | * | 7/1985 | Berger | 360/75 X |
| 4,679,103 A | * | 7/1987 | Workman | 360/77 |
| 5,051,669 A | * | 9/1991 | Hsiao et al. | 318/119 |
| 5,327,053 A | * | 7/1994 | Mann et al. | 318/254 |
| 5,612,833 A | | 3/1997 | Yarmchuk et al. | |
| 5,757,574 A | * | 5/1998 | Chainer et al. | 360/75 |
| 5,835,302 A | * | 11/1998 | Funches et al. | 360/78.07 |
| 5,875,064 A | * | 2/1999 | Chainer et al. | 360/75 |
| 5,898,286 A | * | 4/1999 | Clare et al. | 360/78.09 |
| 6,034,496 A | * | 3/2000 | Male | 318/439 |

FOREIGN PATENT DOCUMENTS

WO        WO 94/11864        5/1994

* cited by examiner

Primary Examiner—David Hudspeth
Assistant Examiner—K Wong

(74) Attorney, Agent, or Firm—Marian Underweiser; Jon A. Gibbons; Fleit, Kain, Gibbons, Gutman & Bongini P.L.

(57) ABSTRACT

A method and apparatus to determine and correct track spacing during self-servowriting on a rotating recording medium. The recording medium comprising a plurality of tracks, wherein each track comprises a plurality of sectors, and a transducer mounted on an actuator arm pivotally coupled to a voice coil motor (VCM). The actuator arm is positioned by a servo. The method comprising the steps of: servowriting the at least one of the plurality of sectors with a servo pattern consisting of recorded transitions. The servowriting is performed on one more tracks within the sectors where the number of tracks being servowritten is less than total number of tracks that fills the rotating medium. The transducer is positioned relative to the rotating recording medium to a preselected radial position over a previously servowritten area of the rotating recording medium that has one or more previously recorded transitions. Next, an angular acceleration is imposed on the actuator arm by applying a predetermined amount of current to the VCM. The measurement and correction of a spacing of the tracks in the previously servowritten area is performed by measuring the amplitudes of the previously recorded transitions at least one time during the passage of the sectors beneath the transducer, and if the calibratng of the spacing is outside a predetermined tolerance, then continuing servowriting new recorded transitions using said adjustment factor on tracks following said previously servowritten area. In one embodiment, the method includes measuring a VCM torque constant (K) by applying a current impulse for a predetermined time (t) and measuring the back Electromotive Force (EMF) generated from the VCM to determine the torque per unit for the current impulse for the predetermined time (t) and to determine the back Electronic Force (EMF) per unit of angular velocity of the actuator arm. After the torque constant is determined, an adjustment factor is computed based on the values of the torque constant (K), the current impulse for the period of time (t), and the back Electromotive Force (EMF)per unit of angular velocity of the actuator arm. This adjustment factor is used while servowriting now recorded transitions tacks following the previously servowritten area.

15 Claims, 9 Drawing Sheets

METHOD AND APPARATUS FOR ABSOLUTE TRACK SPACING DETERMINATION FOR SELF-SERVOWRITING

CROSS-REFERENCE TO RELATED APPLICATIONS

Not applicable

BACKGROUND OF THE INVENTION

1. Field of the Invention

This invention relates generally to hard disk drive memory storage devices and more particularly to a method and apparatus for determining and correcting the absolute track spacing without having to traverse across the entire disk surface.

2. Description of the Related Art

As described in International Patent Application, WO 94/11864, high track densities are possible with voice-coil and other types of servo positioners as well as the ability to read and write narrower tracks by using, for example, magneto resistive (MR) head technology. Previously, low track density disk drives were able to achieve satisfactory head positioning with lead screw and stepper motor mechanisms. However, when track densities are so great that the mechanical error of a lead screw-stepper motor combination is significant compared to track-to-track spacing, an embedded servo is needed so that the position of the head can be determined from the signals it reads.

Conventional hard disk manufacturing techniques including writing servotracks on the media of a head disk assembly (HDA) with a specialized servowriter instrument. Laser positioning feedback is used in such instruments to read the actual physical position of a recording head used to write the servotracks. Unfortunately, it is becoming more and more difficult for such servowriters to invade the internal environment of a HDA for servowriting because the HDAs themselves are exceedingly small and depend on their covers and castings to be in place for proper operation. Some HDAs are the size and thickness of a plastic credit card. At such levels of micro miniaturization, traditional servowriting methods are inadequate.

Conventional servo-patterns typically comprise short bursts of a constant frequency signal, very precisely located offset from a data track's center line, on either side. The bursts are written in a sector header area, and can be used to find the center line of a track. Staying on center is required during both reading and writing. Since there can be between seventeen to sixty, or even more, sectors per track, that same number of servo data areas must be dispersed around a data track. These servo-data areas allow a head to follow a track center line around a disk, even when the track is out of round, as can occur with spindle wobble, disk slip and/or thermal expansion. As technology advances provide smaller disk drives, and increased track densities, the placement of servo data must also be proportionately more accurate.

Servo-data is conventionally written by dedicated, external servowriting equipment, and typically involves the use of large granite blocks to support the disk drive and quiet outside vibration effects. An auxiliary clock head is inserted onto the surface of the recording disk and is used to write a reference timing pattern. An external head/arm positioner with a very accurate lead screw and a laser displacement measurement device for positional feedback is used to precisely determine transducer location and is the basis for track placement and track-to-track spacing. The servo writer requires a clean room environment, as the disk and heads will be exposed to the environment to allow the access of the external head and actuator.

U.S. Pat. No. 4,414,589 to Oliver et al. issued Dec. 14, 1981, entitled "Servo track following system and method for writing servo tracks" discloses servowriting wherein optimum track spacing is determined by positioning one of the moving read/write heads at a first limit stop in the range of travel of the positioning means. A first reference track is then written with the moving head. A predetermined reduction number or percentage of amplitude reduction X %, is then chosen that is empirically related to the desired average track density. The first reference track is then read with the moving head. The moving head is then displaced away from the first limit stop until the amplitude of the first reference track is reduced to X % of its original amplitude. A second reference track is then written with the moving head and the moving head is then displaced again in the same direction until the amplitude of the second reference track is reduced to X % of its original value. The process is continued, writing successive reference tracks and displacing the moving head by an amount sufficient to reduce the amplitude to X % of its original value, until the disc is filled with reference tracks. The number of reference tracks so written is counted and the process is stopped when a second limit stop in the range of travel of the positioning means is encountered. Knowing the number of tracks written and the length of travel of the moving head, the average track density is checked to insure that it is within a predetermined range of the desired average track density. If the average track density is high, the disc is erased, the X % value is lowered and the process is repeated. If the average track density is low, the disc is erased, the X % value is increased and the process is repeated. If the average track density is within the predetermined range of the desired average track density, the desired reduction rate X %, for a given average track density, has been determined and the servo writer may then proceed to the servo writing steps.

Unfortunately, Oliver et al. does not disclose how to determine absolute spacing without first servo writing the entire hard disk surface. The servowriter throughput is substantially reduced by having to rewrite the entire surface whenever the spacing is outside the acceptable range. Accordingly, a need exists to determine and adjust the absolute accuracy of the servo pattern without the need to rewrite the entire surface whenever the spacing is outside an acceptable tolerance.

U.S. Pat. No. 5,612,833 of Yarmchuk et al, issued Mar. 18, 1997 entitled "Radial Self-propagation Pattern Generation For Disk File Servowriting" discloses a method and apparatus for radial self-propagation pattern generation, and commonly assigned herewith. Yarmchuk disclosed a method and apparatus of writing more uniformly spaced tracks. During that write revolution, a position error signal corresponding to the position error of the transducer relative to the previously recorded transition is determined. That position error signal is then stored, during the write revolution, to be used in computing a reference track value associated with the transition being written to correct for the position error. Additionally, a product servo-pattern is written, which includes an embodying of the position error therein.

A shortcoming of the some prior techniques is the lesser accuracy in placement of the servo patterns. The requirement for ever closer track spacing in disk files makes highly accurate servo pattern writing highly desired. Therefore a need exists for a method to accurately determine and adjust the track spacing of a self-servowritten disk without adding any additional equipment, either externally or internally, to the disk unit in order to measure the absolute pattern spacing.

Many newer disk drive units are now designed with a load/unload ramp at the outer edge of the disk instead of a rigid crash stop at the outer crash stop. The head suspension is lifted away from the disk surface by this ramp during the process of unloading the head from the disk. Unlike a rigid crash stop, the actuator arm can be moved beyond the point of contact. This makes detection more difficult, and can lead to disk damage if the heads are only partially lifted off the disk. The unload process is highly reliable, but must take place in one continuous motion. Therefore, a need exists for determining and correcting the absolute track spacing of a self-servowritten disk without having to rely on a crash stop.

SUMMARY OF THE INVENTION

Briefly, in accordance with the present invention, disclosed is a method and apparatus to determine and correct track spacing during self-servowriting on a rotating recording medium. The recording medium comprising a plurality of tracks, wherein each track comprises a plurality of sectors, and a transducer mounted on an actuator arm pivotally coupled to a voice coil motor (VCM). The actuator arm is positioned by a servo. The method comprising the steps of: servowriting the at least one of the plurality of sectors with a servo pattern consisting of recorded transitions. The servowriting is performed on one more tracks within the sectors where the number of tracks being servowritten is less than the total number of tracks that fills the rotating medium. The transducer is positioned relative to the rotating recording medium to a preselected radial position over a previously servowritten area of the rotating recording medium that has one or more previously recorded transitions. Next, an angular acceleration is imposed on the actuator arm by applying a predetermined amount of current to the VCM. The measurement and correction of a spacing of the tracks in the previously servowritten area is performed by measuring the amplitudes of the previously recorded transitions at least one time during the passage of the sectors beneath the transducer, and if the calibrating of the spacing is outside a predetermined tolerance, then continuing servowriting new recorded transitions using said adjustment fact on tracks following said previously servowritten area. In one embodiment, the method includes measuring a VCM torque constant (K) by applying a current impulse for a predetermined time (t) and measuring the back Electromotive Force (EMF) generated from the VCM to determine the torque per unit for the current impulse for the predetermined time (t) and to determine the back Electromotive Force (EMF) per unit of angular velocity of the actuator arm. After the torque constant is determined, an adjustment factor is computed based on the values of the torque constant (K), the current impulse for the period of time (t), and the back Electromotive Force (EMF) per unit of angular velocity of the actuator arm. This adjustment factor is used while servowriting new recorded transitions tracks following the previously servowritten area.

DETAILED DESCRIPTION OF AN EMBODIMENT

U.S. Pat. No. 5,612,833 of Yarmchuk et al, issued Mar. 18, 1997 entitled "Radial self-propagation pattern generation for disk file servowriting" discloses a method and apparatus for radial self-propagation pattern generation, and commonly assigned herewith and is incorporated herein by reference and discloses a method and apparatus of writing more uniformly spaced tracks.

Figure 1:
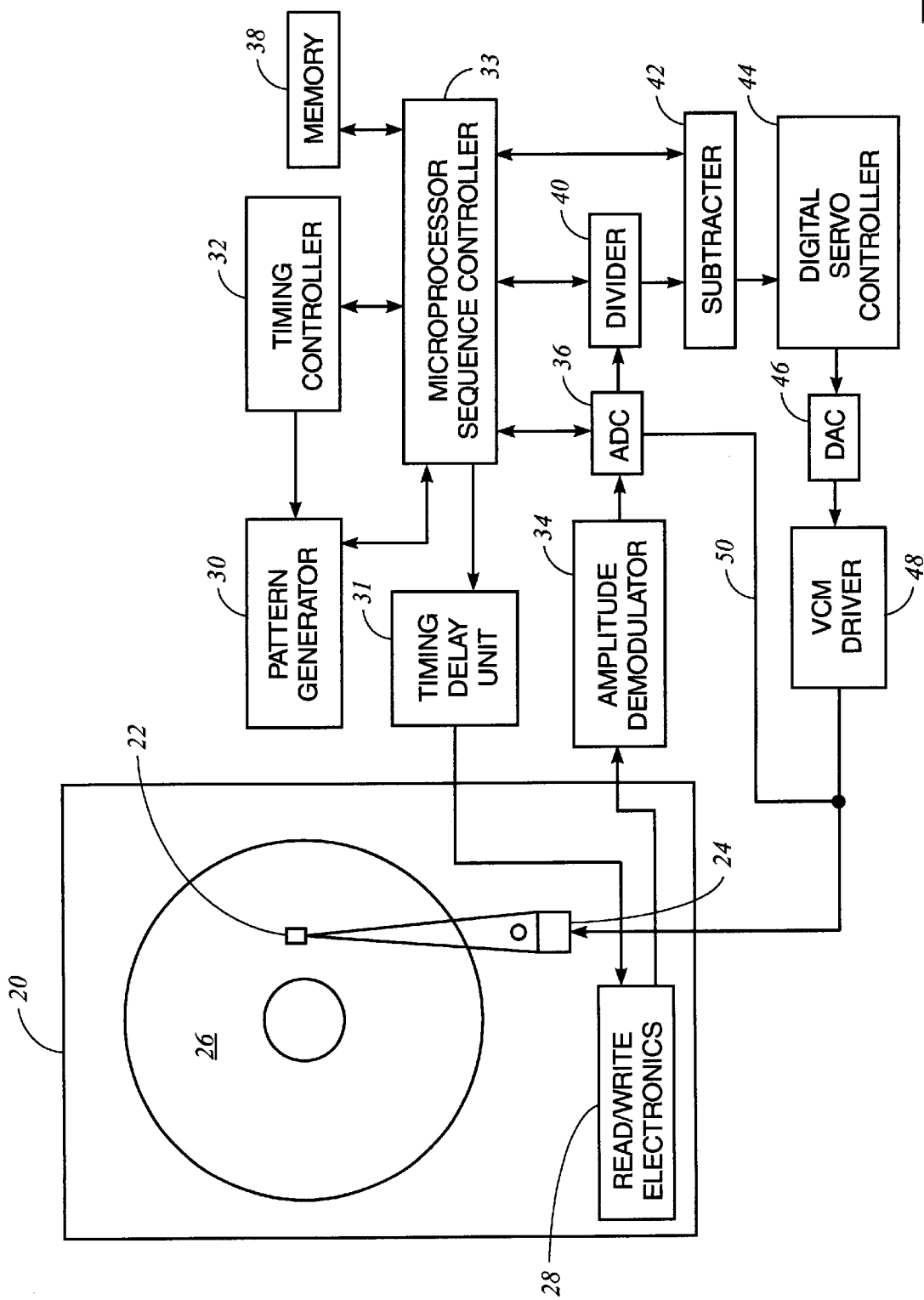
FIG. 1 is a block diagram showing the major elements of an embodiment of the present invention.

FIG. 1 shows the major components of a preferred embodiment of the present invention. A disk drive 20 with its recording transducer 22, voice coil actuator 24, recording medium or disk 26, and read/write control electronics 28, is connected to a time delay unit 31 in series with a pattern generator 30, which is clocked by a timing controller 32 that allows bursts of magnetic transitions to be recorded at precisely controlled times. For the purposes of radial self-propagation burst writing and detection, the timing controller can be a unit such as the AM9513A system timing controller manufactured by Advanced Micro Devices Corporation of Sunnyvale, Calif. that is simply synchronized to a once per revolution index timing mark, but it is understood that the writing of actual product servo patterns requires much tighter timing control, particularly when writing the servo identification fields and whenever writing phase encoded servo patterns. Methods for achieving such precise timing control using the internal disk file recording transducer, in a manner consistent with self-propagation are described in the related U.S. Pat. No. 5,615,058, issued Mar. 25, 1997 to Chanier et al for a "Method and System for Writing a Servo-Pattern on a Storage Medium" and commonly assigned herewith.

A readback signal from a file read/write electronics circuit 28 is connected to an amplitude demodulator circuit 34, the output of which is converted to digital form by an analog to digital converter (ADC) 36 at times determined by timing controller 32 acting in concert with a microprocessor sequence controller 33. Sequence controller 33 also accesses a memory 38 for storage and retrieval of digitized readback amplitudes used by a divider 40. Sequence controller 33 with memory 38 also provide for the storage and retrieval of reference table values used by a subtracter 42 in creating the position error signal (PES) that serves as the input to a digital servo controller 44. Sequence controller 33 also provides computation capabilities for general use in determining modifications to the stored reference table values and for determining appropriate delay settings to be applied to timing delay unit 31, and producing control signals for pattern generator 30. The output of digital servo controller 44 is converted to analog form by a digital to analog converter (DAC) 46, and is further amplified and converted to a current by a VCM driver 48. The driver current is applied to voice coil motor (VCM) 24 in the disk file causing recording transducer 22 to move approximately radially with respect to recording medium 26. In one embodiment, the functions of divider 40, subtracter 42, and digital servo controller 44 are all achieved through the appropriate programming of microprocessor sequence controller 33.

Figure 2:
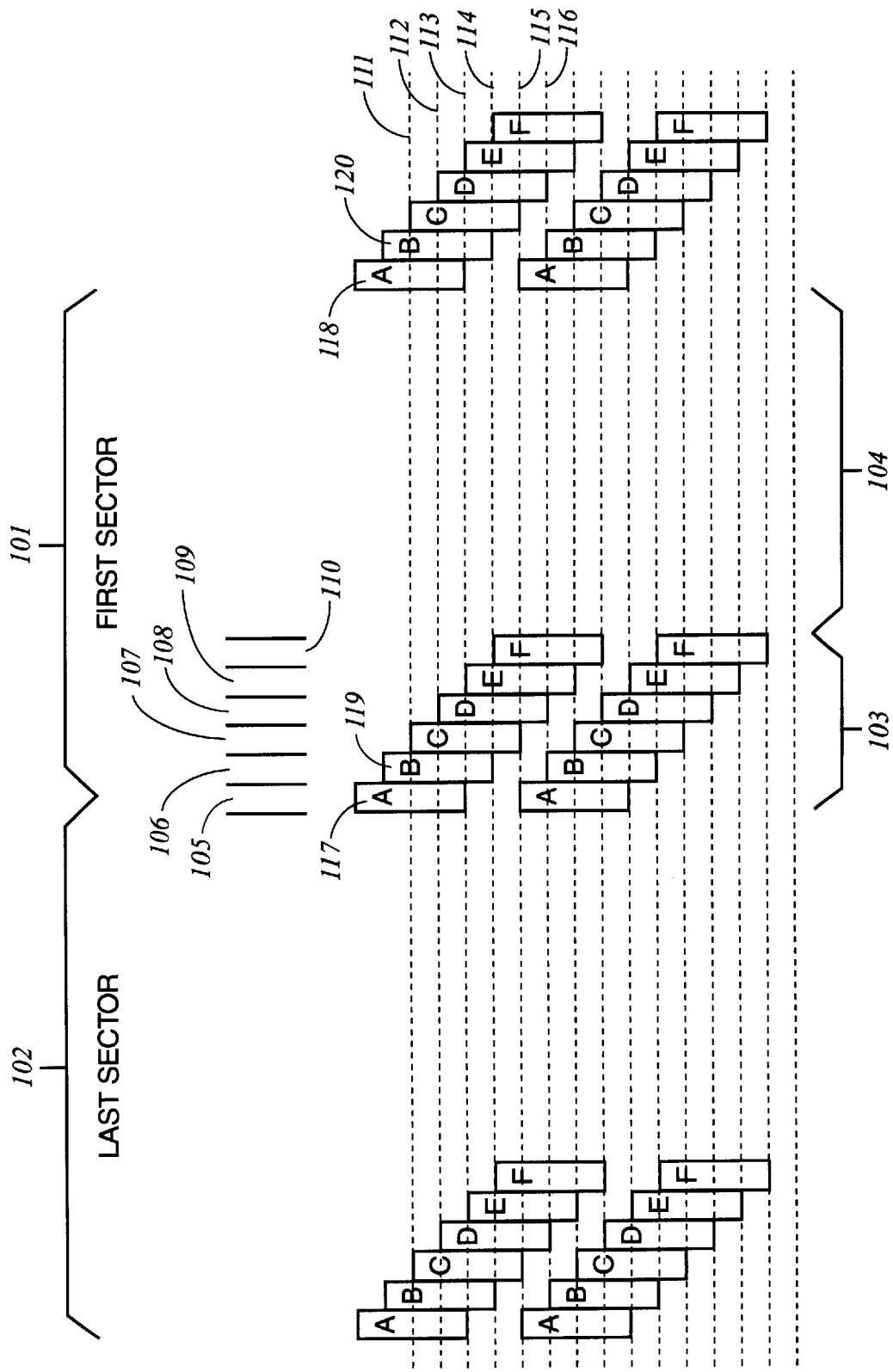
FIG. 2 is a diagram illustrating the relationship between the propagation tracks, disk sectors and propagation bursts.

FIG. 2 shows a diagram of a portion of recording medium 26 illustrating the division into a number of propagation tracks 111, 112, 113, etc. as well as a division of each track into a number of sectors, with a first sector 101 typically coming immediately after the disk rotation index as determined either by an index pulse from the disk spindle motor driver or from the timing controller. Each sector is further divided into a region 103 containing the amplitude bursts for propagation and a region 104, which is reserved for the use of the precision timing propagation system and for writing the actual product servo pattern including sector ID fields and either amplitude burst or phase encoded patterns. In one embodiment of this system propagation burst areas 103 will be overwritten with user data following servowriting. All of region 104 except for the part containing the product servo pattern will also be overwritten with user data. Each propagation burst region is further divided into a number of slots 105–110 within which the amplitude burst patterns (A,B,C, D,E, and F) for propagation are written. In this figure, the propagation track pitch is shown as one quarter of the assigned data track width. For example, if the first user data track is chosen to be centered on propagation track 112, the next data track would be centered on propagation track 116, and so on across the disk. Other ratios of propagation to data track pitch can be used, but the 4:1 ratio shown allows fine adjustment of the timing of grey code bits and phase encoded product servo patterns. Typically, the data track pitch is chosen to be slightly larger than the transducer write width so the edges of adjacent data tracks do not overlap. This can be seen in FIG. 2 by noting the relative radial locations of B and F bursts since these correspond to the above-mentioned choices of data tracks centered on propagation tracks 112 and 116 respectively. The propagation burst pattern shown consists of a repeating sequence of 6 bursts. This is useful because the bursts in each slot do not overlap along the radial direction thereby allowing the recording transducer to back up and read previously written bursts. Such a process can be used to check the spacing of the propagation tracks relative to the recording transducer width without having to propagate completely across a disk surface. This is described in more detail later. The minimum number of slots required for propagation without such checking is 2.

A typical number of sectors is 120 and a typical disk rotation rate is 5400 rpm, giving about 92 microseconds per sector. A typical slot time is 4 microseconds. This is longer than the typical amplitude burst duration used in a product servo pattern (1 microsecond) but there is no loss of user data space with expanded propagation bursts since they will be overwritten later. An advantage of longer bursts is that they allow more filtering time to be used during demodulation resulting in a higher signal to noise ratio which simplifies some of the digital servo loop computation, particularly with regard to determining derivative or velocity related servo terms. Shorter burst times could be used if more time is needed for timing marks and product servo pattern writing in regions 104.

Figure 3:
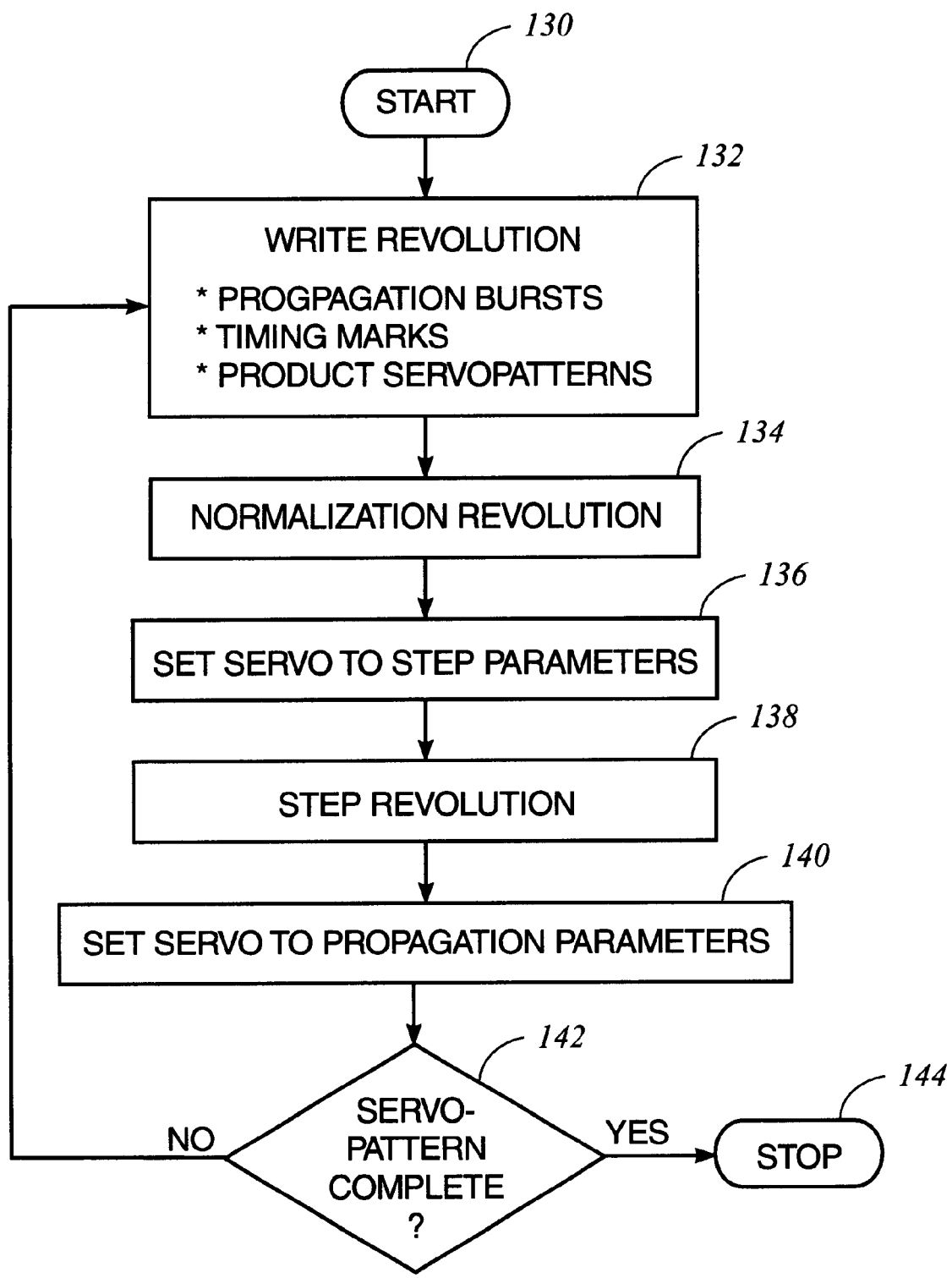
FIG. 3 is a flow diagram illustrating the basic process steps writing a radial propagation pattern.

Referring to the flow diagram of FIG. 3, the iterative self-propagation process starts with step 130 in which the recording transducer is located at either the outermost accessible track (OD) or innermost accessible track (ID) of the disk file with the motor being pushed against a physical stop to lock it against mechanical disturbances. In step 132, first propagation track 111 (FIG. 2) is written with A bursts in the first slot of each propagation burst region. This first revolution in the process is referred to as a write revolution.

On the next revolution of the disk, referred to as a normalization revolution and shown as step 134 in FIG. 3, sequence controller 33 signals ADC 36 to sample and digitize the demodulated readback amplitude during the first slot of each sector and records these values in an A burst normalization table in memory 38.

After all sectors have been read in the normalization revolution but before the first propagation burst region 103 of the next revolution the parameters used in the servo control voltage calculation are set equal to predetermined values referred to as step parameters that provide rapid motion and settling, that is the gain and bandwidth are high. This is shown as step 136 in FIG. 3. As an example, servo parameters similar to those used in the operation of the disk file would work well as step parameters.

On the next revolution of the disk, referred to as a step revolution and shown as step 138, sequence controller 33 steps through the stored normalization table sector by sector, routing each value to divider 40. A reference track table in the memory has been pre-recorded with initial reference levels corresponding to desired amplitude reduction factors for each of the sectors. Typically, these initial reference levels are all equal. Similarly the reference track table values are routed to subtracter 42. ADC 36 continues digitizing the A bursts of each sector. As recording transducer 22 reaches the end of each propagation burst region 103, the output of subtracter 42 contains a number equal to the reference track table entry for that sector minus the amplitude of the preceding A burst divided by the stored normalization table value. This is the position error signal or PES. At this time, sequence controller 33 signals digital servo controller 44 to read the PES and compute a new control voltage setting. This control voltage is adjusted by the servo controller after each sector to drive VCM 24 in a direction that reduces the PES, i.e., toward propagation track 112.

Once VCM 24 has settled onto the desired location for propagation track 112 (typically in about 1 quarter of a disk revolution) the parameters of the servo control voltage calculation are changed to another set of special predetermined values referred to as propagation parameters that are tailored to provide rejection of mechanical disturbances without amplification of track shape errors. The manner in which these values are determined is described in the Yarmchuk et al patent. Although the step to the next propagation track takes less than a full revolution, it simplifies matters to allow the revolution to complete before writing the next set of bursts. In one embodiment, this change in servo parameters is done gradually with the propagation parameters being reached only at the end of the step revolution. In FIG. 3 this process of setting the servo to have the propagation parameters is shown following step revolution 138, and is referred to as a step 140.

At this point only a single propagation track has been written so the result of a decision step 142 in which a count of propagation tracks is compared with a predetermined desired number. In this second write revolution 132, the sequence controller 33 signals pattern generator 30 to write bursts of transitions, B in the second slot of each sector. Throughout this write revolution, ADC 36 continues digitizing the A bursts and servo controller 44 maintains VCM 24 in a position such that transducer 22 stays close to the desired location of track 112. The PES values during the write revolutions are recorded in a table in memory 38 for use later in calculating new reference track values.

The next revolution is a normalization revolution, step 134, in which ADC 36 digitizes both the A & B burst amplitudes, storing the B burst amplitudes in a B burst normalization table, while the servo loop continues to track using PES values computed from the A burst amplitudes, the A burst normalization table values, and the stored reference track values. A new reference track table is also computed during this revolution. To propagate without growth of track shape errors, a previously recorded PES value is factored in as follows, however, this is not needed to practice the most fundamental embodiment of the present invention. Each new reference track table value is set equal to a nominal average reference level determined previously to be appropriate for the desired average track spacing in this region of the disk plus a predetermined fraction of the previously recorded PES value for the corresponding sector obtained during the preceding write revolution. A convenient method involves replacing each reference track table value just after it is used for the computation of a control voltage. In this way, the servo reference track table during the normalization revolution is utilized with its previous values but ends up containing its new values in preparation for the upcoming step revolution.

It is important to point out that In the most basic embodiment of the present invention, the nominal average reference level is the beginning adjustment factor or adjustment value. Further description of the adjustment factor is described in the section "Adjustment Factor Calculation" below.

Switching to the B bursts for PES computations, the process repeats, and transducer 22 steps to the next propagation track, step 138, followed by a write revolution, step 132, in which C bursts, timing marks and product servo patterns are written, followed by a normalization revolution, step 134, in which the C bursts are read back and stored in a normalization table. This continues (with A bursts following F bursts) until the desired number of test tracks is reached as determined by a yes answer to decision step 142 and the process stops in a step 144.

PHYSICALLY SEPARATE READ AND WRITE ELEMENTS

Figure 4A:
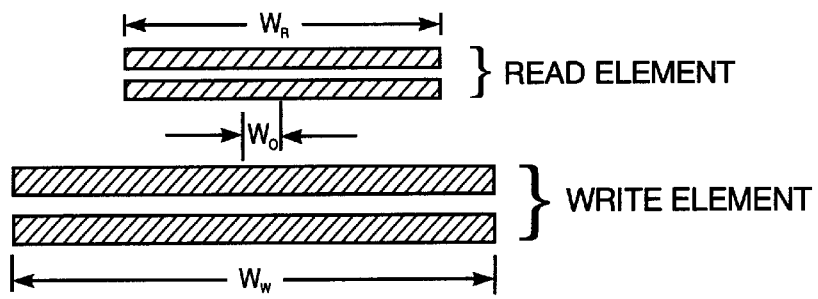
FIG. 4A is an enlarged, schematic diagram of a recording transducer in which the read and write elements are at separate positions.
Figure 4B:
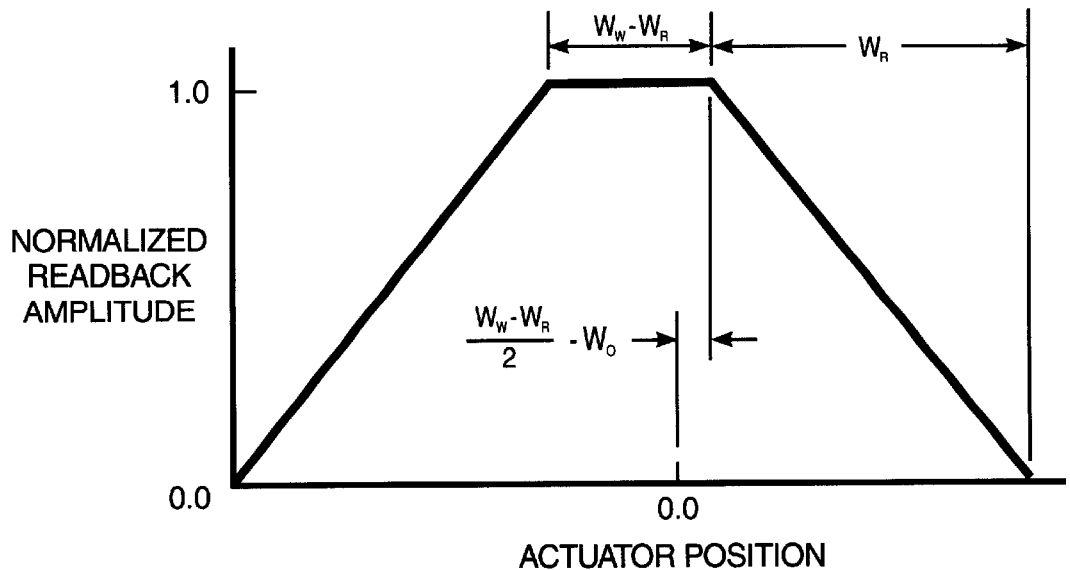
FIG. 4B is an idealized plot of the normalized readback amplitude versus off-track position that would be obtained for a recording transducer such as that shown in FIG. 4A.

In the discussion so far, it has been assumed that the recording read transducer and write transducer are one and the same, as in the typical inductive read/write element commonly used. Recently, transducers employing separate read and write elements such as the so-called MR (magnetoresistive) transducers have come into use, and require special attention with regard to the determination and control of propagation track spacing by means of nominal average reference value settings. FIG. 4A is a diagram of such a transducer showing the different widths of the read and write elements along with an offset between read and write element centers. FIG. 4B shows a plot of how the normalized readback amplitude varies with the position of the actuator. Here, zero corresponds to the actuator position during the write. The actuator movement required to reach a particular level of amplitude reduction depends on the read width, write width, offset, and which direction of motion is desired. It is desirable that the propagation track spacing be determined only by the read and write widths and not be affected by the offset in the elements. This is particularly important since the apparent offset changes as the rotary actuator sweeps from the outermost to the innermost track in a disk file (the spatial separation of the read and write elements along the actuator arm direction leads to different projected locations of these elements onto the disk track as the arm rotates). An important aspect of this technique is the incorporation of a method for eliminating this dependence on read to write element offset in a manner that requires no prior knowledge of the precise geometry of the head and which can be achieved solely through measurements of readback amplitudes.

Figure 5:
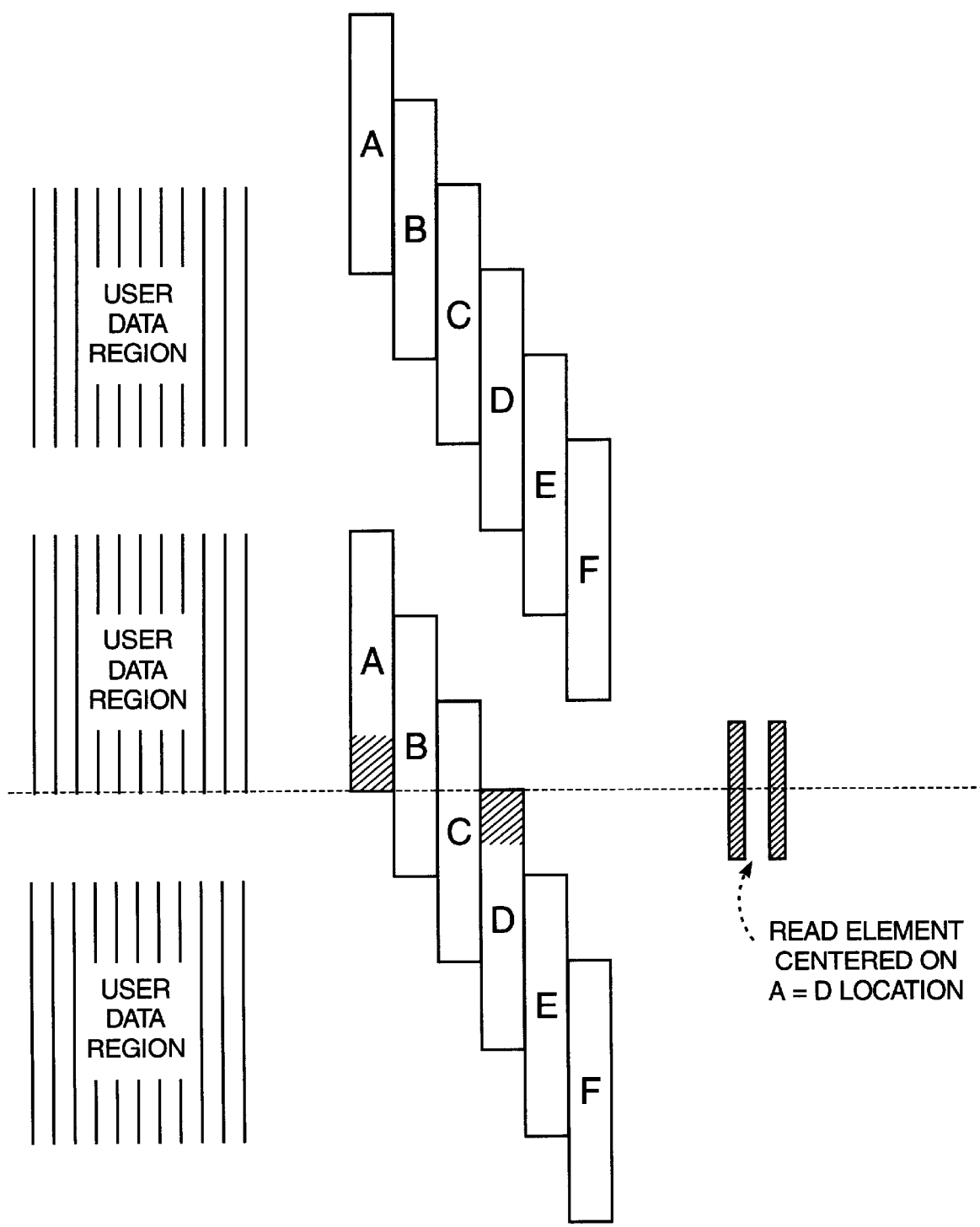
FIG. 5 is a diagram showing the locations of the various propagation bursts in relation to user data tracks and showing a read element positioned such that it yields equal readback amplitudes for an A and a D propagation burst.

FIG. 5 is a diagram of the 6 burst propagation pattern showing the relative locations of the written bursts in one of the propagation burst regions. It is important for disk file data track spacing that, on average, the edges of adjacent tracks should have a specific amount of space between them to avoid overwriting of data on one track by a head that is supposed to be on the adjacent track. For example it may be desired that the data tracks be 4 propagation tracks apart and have an average space between written track edges of 25 percent of the data track pitch. This is the situation illustrated in FIG. 5, where user data tracks are shown assigned to locations corresponding to propagation bursts A and E. In this case, propagation bursts that are 3 steps apart, such as A and D have their edges just lined up. If the read element is positioned so that the relative amplitude from burst A equals the relative amplitude from burst D (the A=D position) then the relative signal is 0.50 if the edges line up, greater than 0.5 if the edges overlap, and less than 0.5 if the edges have space between. Thus, the relative amplitude at the A=D position is an indicator of whether the propagation track pitch is too small or too large and can be used to adjust the nominal average reference level used during propagation to correct the pitch.

If the readback amplitude varies linearly with position (a fairly good approximation) the adjustment in the nominal average reference level for propagation that is required to obtain the correct spacing can be computed from the measured relative amplitude at the A=D position. This can be seen by noting that a change in reference level by an amount r results in a change in the relative amplitude at the A=D position of 3r/2 because each of the 3 steps contributes a spacing change equal to r, and the change is shared equally by A and D. The nominal average reference level should therefore be adjusted by an amount equal to $\frac{2}{3}$ of the deviation of the relative amplitude at the A=D position from its desired level.

The method consists of the following steps. First, choose an initial nominal average reference value and propagate several steps (3 or more in this case). Next, back up to a location such that the relative amplitude of an A burst and D burst are equal. This is accomplished by temporarily re-defining the PES to be the difference between the relative amplitudes of the A and D bursts. Using the relative amplitude of A (or D since they are now equal), compute the correction to the propagation nominal average reference level as described above and continue propagating. In this case, the relative amplitude is the initial adjustment factor or adjustment value as described below.

Figure 6A:
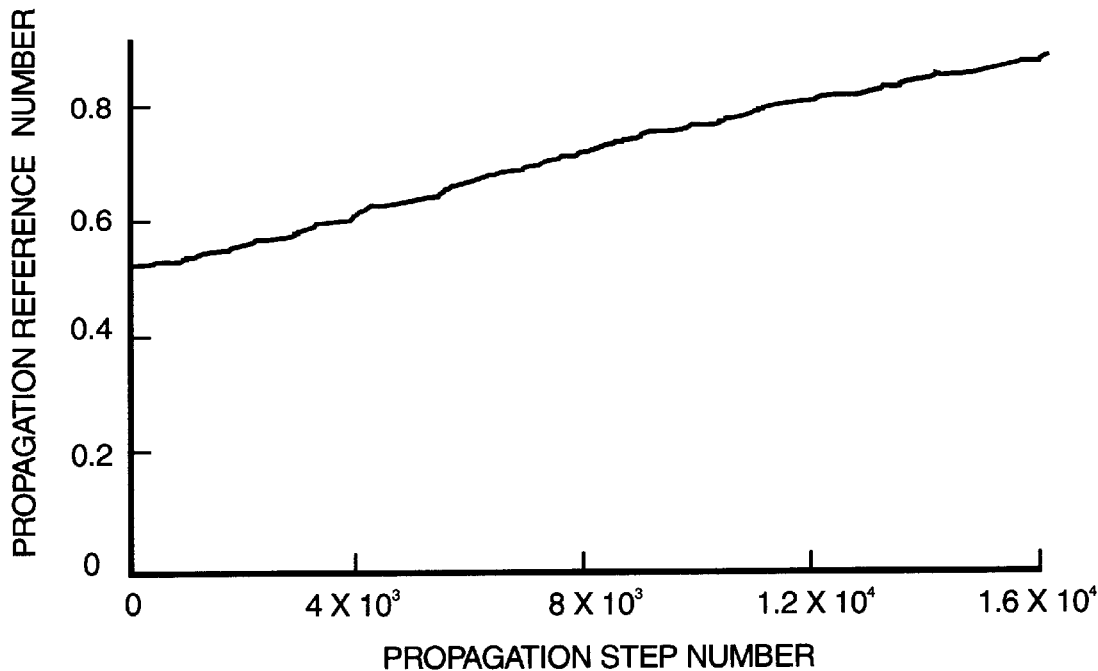
FIG. 6A is a plot of the nominal average reference value versus propagation step number obtained for a self-propagation experiment using a recording transducer having separate read and write elements as shown in FIG. 4A in which adjustments to the nominal average reference value were made by periodically backing up and measuring the average relative burst amplitude at the A=D servo position.
Figure 6B:
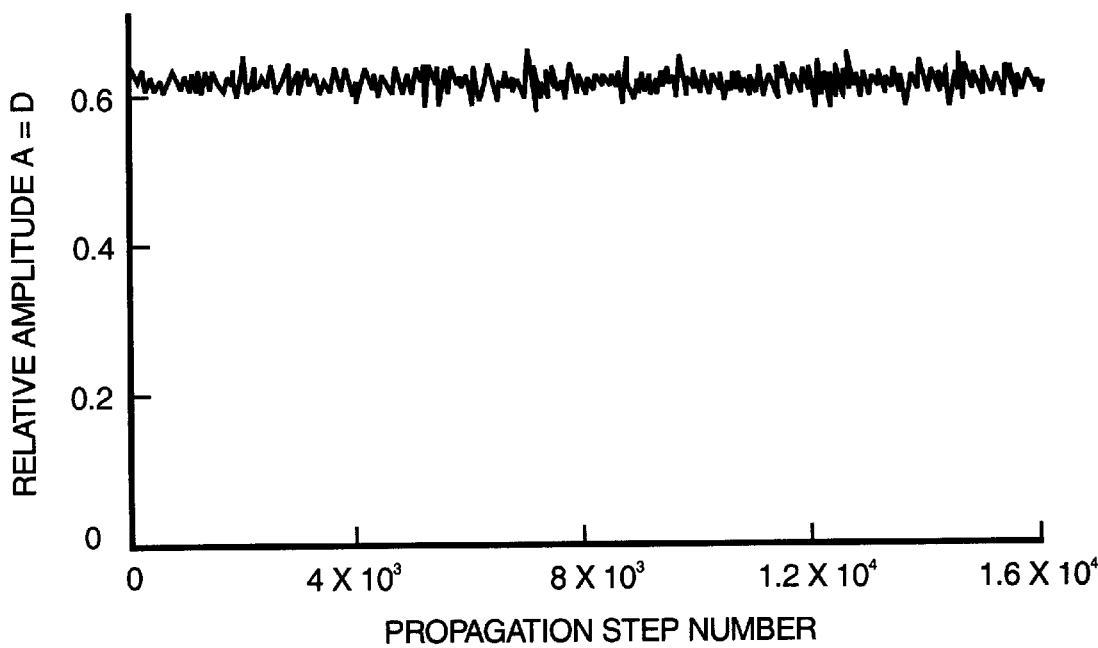
FIG. 6B is a plot of the average relative burst amplitudes obtained during the same experiment as shown in FIG. 6A illustrating the precision with which the track spacing is held constant.

Preferably, this process is repeated several times at the very beginning (in a region that will not be assigned to user data) to initially set the reference level to account for the particular read to write element offset. Note this is similar to the present invention in the test track writing which is described below. Changes in the offset due to rotation of the actuator can be accounted for by repeating the process at regular intervals. In experiments carried out with the system described above, excellent results were obtained by repeating this process every 40 propagation steps. The process was actually carried out by averaging the relative amplitudes at the A=D, B=E, and C=F locations. Also, only a fraction (¼) of the computed corrections to the reference level were applied each time to reduce the effects of noise. Since the reference level changes very slowly, there is an advantage to letting the corrections build up slowly as well. This measurement and correction process required 11 revolutions of the disk and was performed every 40 propagation steps (which take 120 revolutions since each step requires a write, a normalize and a step revolution), hence it increases the servowrite time by only about 9%. FIG. 6A shows the nominal average reference level plotted versus propagation step number for a full run of 16000 steps, and FIG. 6B shows a plot of the relative amplitudes at the A=D positions (averaged with B=E and C=F) measured in the same run. Here the track pitch was chosen to be smaller than that shown in FIG. 5 (the 25% space between written data tracks shown in the figure is actually higher than needed) so that the desired relative amplitude at the A=D position was set to 0.625 rather than 0.5. It can be seen that this method works quite well at holding the track spacing constant (as determined by the relative amplitude at the A=D positions) by systematically adjusting the propagation nominal average reference level. This technique works to set and maintain a constant track spacing, but the actual value of the spacing depends upon the particular recording head chosen. The method in the present invention allows the absolute spacing to be controlled.

It should be understood to those skilled in the art that the methods disclosed in Yarmchuk et al. for controlling the growth of track shape errors by adjusting servo loop parameters and through the computation of reference track table values based on previously recorded PES values may be applied to provide a stable propagation process. Thus, at this stage of the process a uniformly spaced radial propagation pattern has been written. While some small amount of distortion away from perfect circularity is present on each track, the average centerline to centerline spacing is essentially constant and is determined by the nominal average reference level.

In the present technique, the absolute spacing of these test tracks is measured, and an adjustment is applied to the nominal average reference level before proceeding to the writing of the product servo pattern. At this point the entire process disclosed in Yarmchuk et al., including radial propagation as described above interspersed with timing mark and product servo pattern writing maybe applied. Using the adjusted nominal average reference level as determined by this technique, the absolute spacing of the ensuing product patterns will be accurately set to the desired value. In one embodiment, the process may begin by stepping out to the end of the existing test tracks. Alternatively the final propagation may be shifted relative to the disk index so as not to interfere with the initial test tracks.

In a second embodiment of the self-servowriter, the nominal average reference level is iteratively adjusted using measurements of the gap between tracks (physically separate read and write section and FIGS. 5 & 6), as indicated by the relative amplitude at the midpoint between tracks. In this case, a desired relative amplitude is chosen that is approximately correct for most recording heads, the test tracks are written, the absolute spacing measured, and the adjustment will be applied to the relative amplitude since it controls the actual track spacing. The product patterns will then be written using the adjusted relative amplitude parameter.

The principle of the spacing measurement is as follows. The uniformly spaced tracks provide a "ruler" which are used for measurements of dynamical quantities such as angular acceleration of the actuator arm. Imposing an absolute angular acceleration of the arm by applying a known amount of current to the voice coil motor (VCM) of the actuator calibrates the "ruler" provided by the tracks thereby determining the track spacing.

Returning to FIG. 1 shown is connection 50 for electrically coupling the a/d converter 32 to the VCM 24. The a/d converter 32 enables the measuring of the voltage across the coil of VCM 24 and provides the VCM torque constant κ of each hard disk file to improve the accuracy of the measurement of the track spacing.

THEORY OF OPERATION

Figure 7:
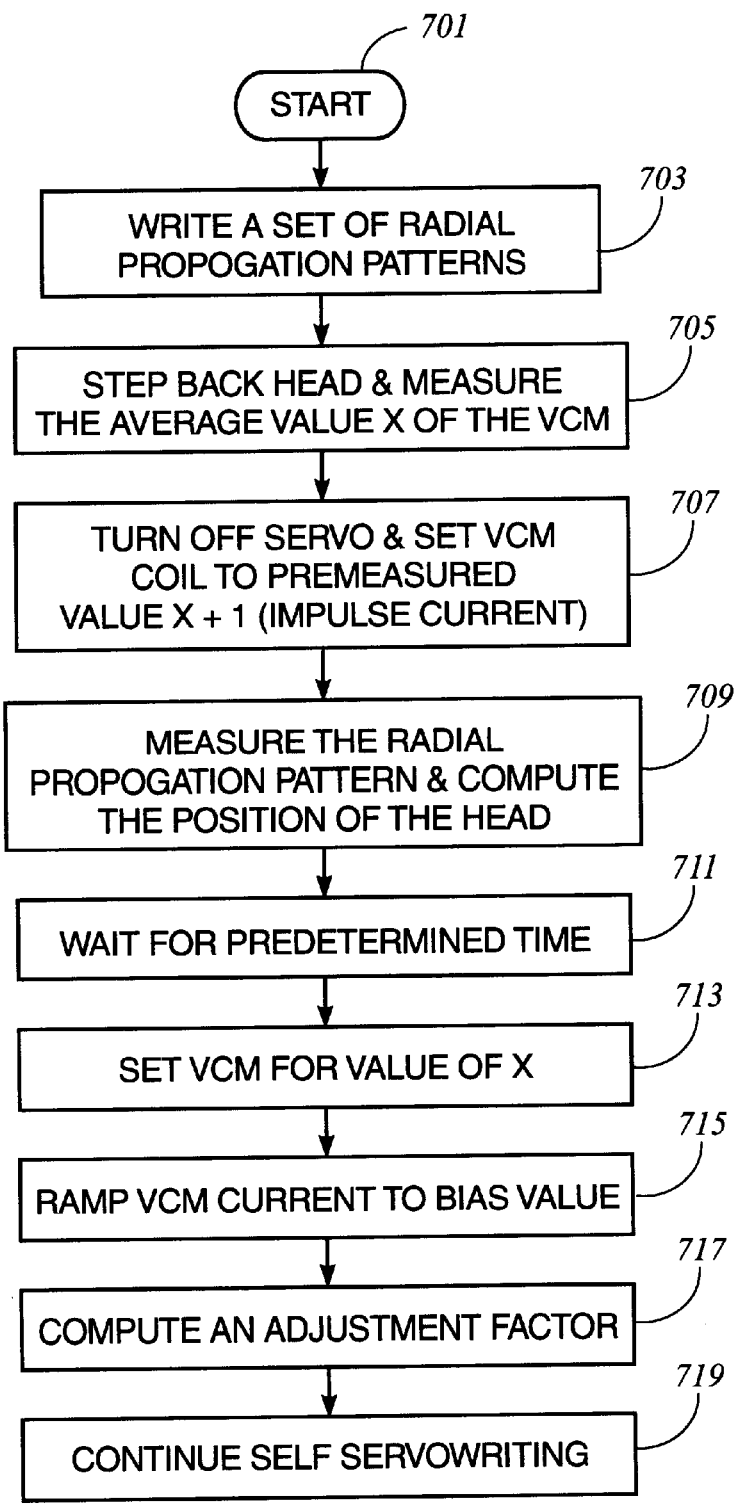
FIG. 7 is a flow diagram illustrating the basic process steps for measuring and correcting the self-servowriter tracks according to the present invention.

FIG. 7 is a flow diagram illustrating the basic process steps for measuring and correcting the self-servowriter tracks according to the present invention. The process starts, step 701, and at step 703, the self-servowriter is positioned at starting at a crash stop and a set of 80 radial propagation tracks are written. In self-servowriter the track spacing is adjusted iteratively so the first 20–30 tracks are not uniformly spaced. The head is stepped back 50 tracks from the end of the pattern and the average value of the VCM current is measured while servoing in step 705. This represents the current required to balance all external torques arising from air flow or cables attached to the actuator. Next, in step 707, the servo is turned off and the current in the VCM coil is set to the previously measured average plus an additional impulse current, i (typically 15 milliamps). At this point, the net torque on the actuator is equal to the impulse current times the VCM torque constant, κ. In step 709, the radial propagation pattern is measured at each sector (there are typically 100 sectors evenly spaced around the disk) and the position of the head is computed in units of track number, Λ. The change in position from sector to sector divided by the time between sectors is the velocity, $$\frac{dN}{dt},$$

in units of tracks per second. In step 711, a predetermined period of time (typically about 20 sector intervals) is passed. Then, in step 713, the VCM current is set to the previously measured average minus the impulse current. This is maintained for the same period of time as the original impulse in order to decelerate the actuator to nearly zero velocity. Following this, in step 715, the current is slowly ramped to the bias value used to hold the actuator against the crash stop. Based on the analysis described below, an adjustment factor is computed for the track spacing, step 717. The head is stepped out to the end of the pattern and a small number of additional tracks are written to settle into the proper spacing. After this, the normal self-servowriter continues writing both radial propagation and product servo patterns, step 719.

ABSOLUTE TRACK PITCH CALCULATION

In self-servowriting system using high impulse currents and short times, friction is unimportant and the actuator accelerates at a constant rate given by $$\frac{d^2\theta}{dt^2} = \frac{i\kappa}{I},$$

where I is the moment of inertia of the actuator, and θ is the angle of rotation about the actuator pivot. The radial velocity of the head, $$L\frac{\partial \theta}{\partial t},$$

therefore increases linearly with time with slope, $$L\frac{i\kappa}{I},$$

where L is the length of the actuator arm measured from the pivot to the head. Fitting the measured velocity, $$\frac{dN}{dt}$$

versus time to a straight line yields a slope equal to the observed acceleration in tracks per second squared, $$\frac{d^2N}{dt^2}.$$

This equals the absolute acceleration times the number of tracks per unit length, P.

Solving for P (which is just the inverse of the spacing), one obtains:

$$P = \frac{I}{i\kappa L}\frac{d^2N}{dt^2} \qquad (1)$$

The overall accuracy of this technique depends upon the accuracy of the various quantities on the right hand side of equation 1. In practice, the process is calibrated by measuring the spacing for patterns written using a conventional positioner rather than actually computing the individual quantities given here. Manufacturing variations are therefore the important factor to consider.

It is important to discuss many of the components of self-servowriter system that have tightly controlled manufacturing variations. To begin, disk rotation speeds are very accurately controlled using crystal clocks so the sector timing accuracy is extremely good, typically within a few rpm (revolutions per minute). In self-servo writing systems, the VCM controllers have drive current accuracy of better than 1%, and could be individually calibrated if so desired. The arm length is maintained to a high fractional accuracy, since it affects track spacing for conventional rotary positioner servowriters. The moment of inertia is determined by mechanical dimensions of the actuator assembly which are also typically very tightly controlled.

The VCM torque constant is potentially a limiting factor since it depends on the magnetic field strength of a set of permanent magnets as well as mechanical tolerances over a fairly small critical distance. In an enhanced embodiment of this technique, the individual file torque constant is measured and accounted for to provide improved accuracy. This measurement is based upon the fact that the torque constant of a VCM determines both the torque per unit of current as well as the voltage (back EMF) per unit of angular velocity when viewed as a generator. Applying a current impulse for a time τ produces an angular velocity equal to, $$\frac{i\kappa\tau}{I},$$

which generates a voltage $$E = \frac{i\kappa^2\tau}{I}.$$

Therefore, measuring E allows κ to be computed.

In this embodiment, the a/d converter of FIG. 1 measures the voltage across the VCM coil to yield the quantity E. A current impulse is applied for a precise amount of time in the manner described above, but before reversing the impulse, the current is reduced to zero and several readings from the a/d converter are obtained and averaged. This simplifies the determination of E since the coil resistance produces no extraneous voltage when the current is zero. Following this, the reverse impulse is applied to stop the actuator, and then it is slowly returned to the crash stop. In principle, this back EMF measurement could be performed at the end of the impulse used for the head velocity measurement describe above. However, the requirement of sampling the head position about 20 times before running off the end of the 50 propagation tracks limits the velocity to a few cm/sec, and results in a very small back EMF. To improve the accuracy of the back EMF measurement, a separate impulse is applied using a much higher current (40×). With $i_v$=the velocity measurement current, and $i_e$=the back EMF measurement current, substituting for the torque constant in equation 1 yields the following expression for the track pitch:

$$P = \frac{1}{i_v L}\frac{d^2N}{dt^2}\sqrt{\frac{i_e \tau I}{E}} \qquad (2)$$

ADJUSTMENT FACTOR CALCULATION

Given the absolute track pitch, P, of the test tracks written using the nominal average reference level, a new average reference level is calculated. This is used in place of the nominal value in computing the reference track table values for subsequent propagation steps, thereby resulting in tracks that are spaced at the desired pitch, P0.

One method that works well and is simple to implement is based on the fact that the readback amplitude varies approximately linearly with off-track position. Thus, a change in reference level, dR (which is the readback amplitude divided by the on-track amplitude), corresponds to a spacing change equal to dR times the width, $W_R$, of the read element. With this method, the adjustment is most easily computed based on the propagation step spacing, which is just the inverse of the pitch. With a measured test track spacing, S (=1/P), and a desired spacing, S0 (=1/P0), the change in spacing that is required is just S0−S, and the adjusted average reference level is given by the nominal average reference level −(S0−S)/$W_R$. The minus sign comes from the fact that the signal starts at the on-track value and decreases with increasing displacement of the head, so a decrease in reference level corresponds to a larger step size in the propagation. In this method, the read element width can be taken to be the average width for a large population of heads. This means that the adjustment will only be approximately correct for a given head, but the final spacing error will usually be very small provided the read width tolerances are reasonable and the initial spacing is moderately close to the desired value. For example, if the initial spacing is within 10% of desired, and the read width is within 10% of the average, the final spacing will only be off by 1%. If larger variations are present, or higher accuracy is required, the process could be repeated by writing another set of test tracks with the first adjusted average reference level. Measuring the pitch of these test tracks and computing another adjustment based on the first adjusted average reference level would yield a further improvement in spacing accuracy.

A similar method of adjustment applies to the second embodiment of the self-servowriter in which the average reference level is iteratively adjusted using measurements of the gap between tracks. In this case, the parameter that controls the spacing is the desired relative amplitude, A, measured by the read element when it is centered on the gap between data tracks as shown in FIG. 5. Here the term relative refers to the readback amplitude relative to the on-track amplitude.

Once again making use of the linear falloff of signal with displacement of the read element, a change in relative amplitude, dA, corresponds to a spacing change of $-2W_R \times dA$. The factor of two arises from the fact that the A track and D track share the same amplitude reduction. With an initial relative amplitude, Ai, used for the test tracks, the adjusted value for the relative amplitude is given by: $Ai-(S0-S)/(2W_R)$.

In this case the spacings refer to the data track spacing of FIG. 5, not the propagation step spacing. For N steps per data track (N=3 in FIG. 5), S=N/P.

EXPERIMENTAL DETAILS

Figure 8:
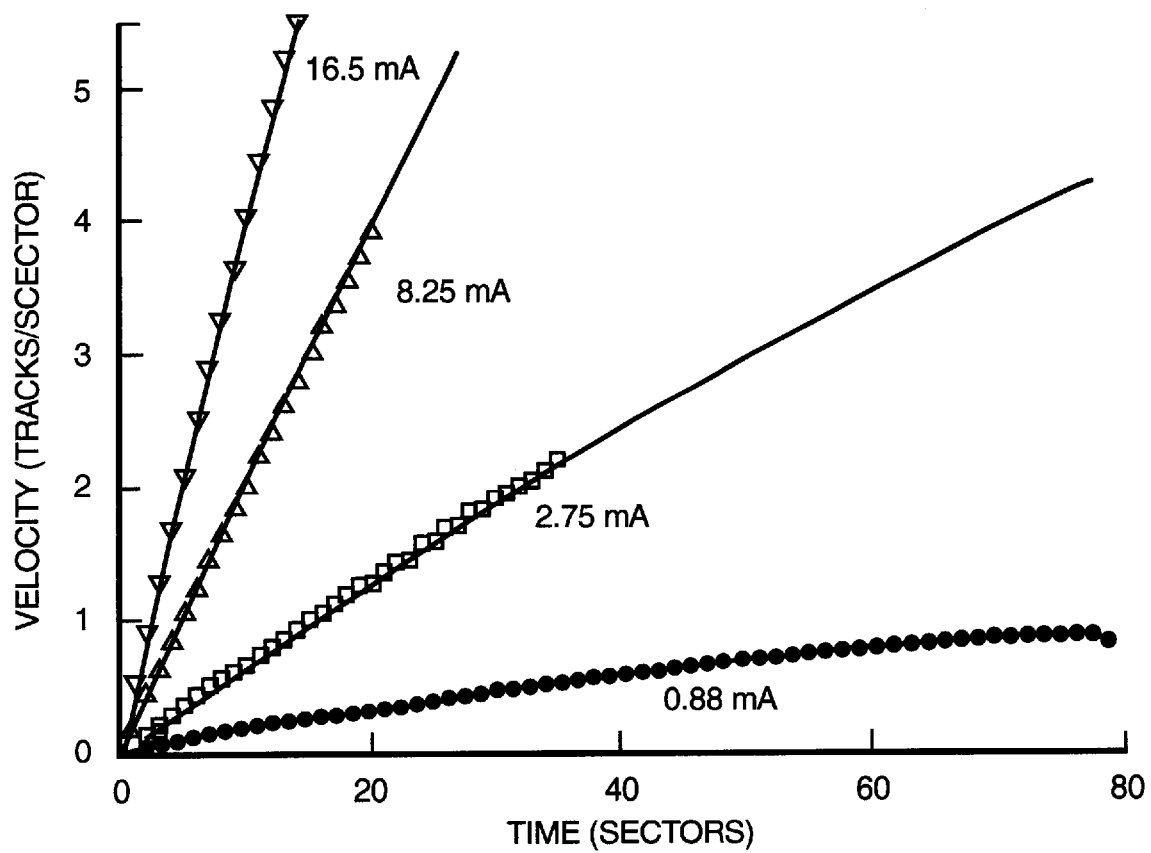
FIG. 8 is a plot of the acceleration curves measured for a prototype disk file according to the present invention.

This technique has been implemented on self-servo writing systems in the lab. Data from experiments on a prototype drive are shown in FIG. 8. This plot illustrates acceleration curves determined from the readback of the radial propagation pattern as described above. Four different impulse currents were applied in a test to determine the effects of pivot hysteresis and other forms of friction. The highest impulse current shown is typical of that used for the track pitch measurement.

Overall, the data agree well with a simple viscous drag model for the friction which introduces a downward curvature to the otherwise linear velocity versus time plots. Pivot hysteresis is expected to introduce an offset shift and a slight distortion in the initial portions of these curves. Little, if any such effect is visible. Both drag and hysteresis can be effectively accounted for by performing second order polynomial fits to the data, as shown by the lines in the figure. The adjustable offset parameter accounts for hysteresis, while the curvature parameter accounts for drag, leaving the slope parameter to properly reflect the free acceleration, $$\frac{d^2N}{dt^2}.$$

Figure 9:
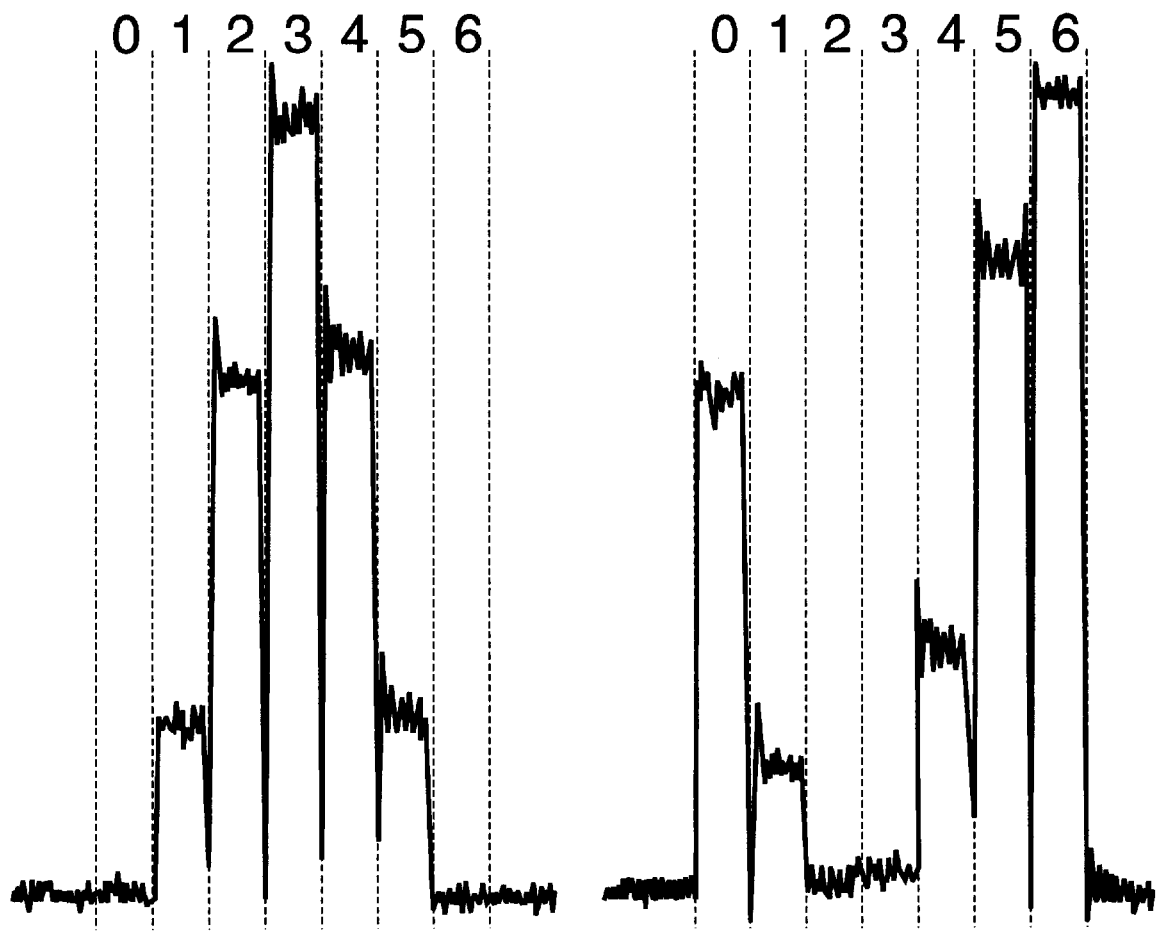
FIG. 9A is a plot of the scope traces of the demodulated read signal for the self-servowriter radial propagation pattern according to the present invention.
FIG. 9B is a plot of the scope traces of FIG. 9A with the head moving out across the recording medium according to the present invention.

In the self-servowriter system the radial propagation pattern for the initial set of tracks consists of a seven burst pattern at a spacing of approximately one quarter of the data track spacing. This is a different number of burst shown in FIG. 2 as discussed above, and it should be understood by those skilled in the art, that the number of burst can be changed within the scope and spirit of the present invention. The bursts are written in sequence so they correspond to track number, but they start over at zero every seventh track. Bursts in the same time slot are seven quarters of a data cylinder apart, which leaves enough space to keep them completely independent on readback. FIG. 9A shows a scope trace of the demodulated read signal from this pattern with the head positioned directly over track 3. As the head moves out the peak slides to the right, wrapping back from burst 6 to 0 as shown in FIG. 9B. The burst numbers correspond to predefined time slots in which the self-servo writing system samples and digitizes the demodulated signal. Each slot is about 4 microseconds long, and the set of seven is repeated for each sector. The self-servowriter system digitizes and stores all seven burst amplitudes on every sector. The head position is determined for each sector by analyzing the set of seven readings. In a basic embodiment, a coarse estimate of head position is given by the maximum amplitude burst. In another embodiment, a more refined estimate could be made by interpolation procedure such as using the three highest amplitude bursts to define a parabola and taking the location of the peak to give the head position. The process is complicated by the fact that the burst readings reflect the track number modulo 7 rather than track number directly, but the fact that the acceleration is constant makes the determination of the exact track easily discernable using known techniques in the art. In another embodiment, the measurement of the track spacing and the correction of the spacing is performed at several predefined intervals across the recording medium. This would allow for the measurement and correction of track pitch due to other variations that occur as the disk head is move across the magnetic medium such as variations due to magnetic variations and other variations caused by movement of the disk head.

In still another embodiment, the measurement of the track spacing and the correction of the spacing as disclosed in this present invention is performed iteratively over the same tracks before the product pattern is written. The use of an iterative process allows the track pitch to be set by a cumulative process of two or more times of measuring and correcting.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method to determine and correct track spacing during self-servowriting on a rotating recording medium comprising a plurality of tracks, wherein each track comprises a plurality of sectors, and a transducer mounted on an actuator arm pivotally coupled to a voice coil motor (VCM), wherein a position of said actuator arm is controlled by a servo controller signal, said method comprising the steps of:

servowriting with a servo pattern consisting of recorded transitions, at least one of said plurality of sectors comprising at least one said plurality of tracks wherein said plurality of tracks is less than a total number of tracks that fills said rotating recording medium;

positioning said transducer relative to said rotating recording medium to a preselected radial position over a previously servowritten area of said rotating recording medium that has one or more previously recorded transitions;

turning off said servo controller signal to said actuator arm and imposing a predetermined angular acceleration on said actuator arm by applying a predetermined amount of current to said VCM; and calibrating a spacing of said tracks in said previously servowritten area, by measuring the amplitudes of said previously recorded transitions at least one time during the passage of said sectors beneath said transducer, and if said calibrating of said spacing is outside a predetermined tolerance, then continuing servowriting new recorded transitions using an adjustment factor on tracks following said previously servowritten area.

2. The method to determine and correct track spacing during self-servowriting on a rotating recording medium of claim 1, further comprising the steps of:

measuring a VCM torque constant (K); and computing an adjustment factor based on the calibration of the position of said transducer and said VCM torque constant.

3. The method to determine and correct tack spacing during self-servowriting on a rotating recording medium of claim 1, further comprising the steps of:

fitting said calibrating of said transducer along a calibration curve through use of higher order polynomials techniques.

4. The method to determine and correct track spacing during self-servowriting on a rotating recording medium of claim 1, further comprising the steps of:

measuring a VCM torque constant (K) by applying a current impulse for a predetermined time (t) and measuring the back Electromotive Force (EMF) generated from said VCM to determine the torque per unit for said current impulse for said predetermined time (t) and to determine the back Electromotive Force (EMF) per unit of angular velocity of said actuator arm;

computing an adjustment factor based on the values of said torque constant (K), said current impulse for said period of time (t), and said back Electromotive Force (EMF) per unit of angular velocity of said actuator arm; and re-servowriting new recorded transitions using said adjustment factor over said previously servowritten area without re-servowriting new recorded transitions in tracks of said rotating recording medium within said predetermined tolerance.

5. A method to determine track spacing during servowriting on a rotating recording medium comprising a plurality of sectors containing tracks having track numbers; and a transducer mounted on an actuator arm pivotally coupled to a voice coil motor (VCM), wherein a position of said actuator arm is controlled by a servo controller signal, said method comprising the steps of:

servowriting a recorded transition on at least one of said plurality of sectors comprising a series of n burst patterns so that each burst pattern corresponds to a track number; and burst patterns are written in sequence so they correspond to a track number wherein said burst patterns repeat every n tracks, wherein said tracks being servowritten is less than a total number of tracks that fills said rotating recording medium;

positioning said transducer relative to said rotating recording medium to a preselected radial position over a previously servowritten area;

turning off said servo controller to said actuator arm signal and imposing a predetermined angular acceleration on said actuator arm by applying a predetermined amount of current to said VCM; and calibrating a spacing of said tracks in said previously servowritten area, by measuring the amplitudes of said previously recorded transitions at least one time during the passage of said sectors beneath said transducer and measuring a torque constant (K) by applying a current impulse for a predetermined time (t) and measuring the back Electromotive generated from said VCM a recording to said VCM Force (EMF) to determine the torque per unit for said current impulse for said predetermined time (t) and to determine the back Electromotive Force (EMF) per unit of angular velocity of said actuator arm, and if said calibrating of said spacing is outside a predetermined tolerance, then performing the sub-steps of:

computing an adjustment factor based on the values of said torque constant (K), said current impulse for said period of time (t), and said back Electromotive Force (EMF) per unit of angular velocity of said actuator arm; and continuing servowriting new recorded transitions using said adjustment factor on tracks following said previously servowritten area and without first positioning said transducer to a limit stop.

6. An apparatus to determine and correct track spacing during self-servowriting on a rotating recording medium comprising a plurality of tracks, wherein each track comprises a plurality of sectors, one or more of said plurality of sectors including a previously recorded transition, and a transducer mounted on an actuator arm pivotally coupled to a voice coil motor (VCM), wherein a position of said actuator arm is controlled by a servo controller signal, said apparatus comprising:

servowriting means for servowriting with a servo pattern consisting of recorded transitions, at least one of said plurality of sectors comprising at least one said plurality of tracks wherein said plurality of tracks is less than a total number of tracks that fills said rotating recording medium;

positioning means for positioning said transducer relative to said rotating recording medium to a preselected radial position over a previously servowritten area of said rotating recording medium that has one or more previously recorded transitions;

acceleration means turning off said servo controller signal to said actuator arm and imposing a predetermined angular acceleration on said actuator arm by applying a predetermined amount of current to said VCM; and calibrating means for calibrating a spacing of said tracks in said previously servowritten area, by measuring the amplitudes of said previously recorded transitions at least one time during the passage of said sectors beneath said transducer, and if said calibrating of said spacing is outside a predetermined tolerance, then re-servowriting new recorded transitions using an adjustment factor over said previously servowritten area without re-servowriting new recorded transitions in tracks of said rotating recording medium that were previously servo written within said predetermined tolerance.

7. The apparatus to determine and correct track spacing during self-servowriting on a rotating recording of claim 6, further comprising:

measuring means for measuring a VCM torque constant (K); and computing means for computing an adjustment factor based on the calibration of the position of said transducer and maid VCM torque constant.

8. The apparatus to determine and correct track spacing during self-servowriting on a rotating recording of claim 6, further comprising:

fitting means for fitting said calibrating of said transducer along a calibration curve through use of higher order polynomials techniques.

9. The apparatus to determine and connect track spacing during self-servowriting on a rotating recording of claim 6, further comprising:

measuring means for measuring a torque constant (K) by applying a current impulse to said VCM for a predetermined time (t) and measuring the back Electromotive Force (EMF) generated from said VCM to determine the torque per unit for said current impulse for said predetermined time (t) and to determine the back Electromotive Force (EMF) per unit of angular velocity of said actuator arm;

computing means for computing an adjustment factor based on the values of said torque constant (K), said current impulse for said period of time (t), and said back Electromotive Force (EMF) per unit of angular velocity of said actuator arm; and re-servowriting means for re-servowriting new recorded transitions using said adjustment factor over said previously servowritten area without re-servowriting new recorded transitions in tracks of said rotating recording medium that were previously servo written within said predetermined tolerance.

10. The apparatus to determine track spacing for servowriting on a rotating recording medium of claim 9, wherein the measurement means, the computing means and the re-servoing means are repeated across the rotating recording medium by changing the position of said transducer relative to said rotating recording medium in said position means.

11. An apparatus to determine and correct track spacing during self-servowriting on a rotating recording medium comprising a plurality of sectors containing tracks having track numbers; and a transducer mounted on an actuator arm pivotally coupled to a voice coil motor (VCM), wherein a position of said actuator arm is controlled by a servo controller signal, said apparatus comprising:

servowriting means for writing a recorded transition on at least one of said plurality of sectors comprising a series of n burst patterns so that each burst pattern corresponds to a track number; and burst patterns are written in sequence so they correspond to a track number wherein said burst patterns repeat every n tracks wherein said tracks being servowritten is less than a total number of tracks that fills said rotating recording medium;

positioning means for positioning said transducer relative to said rotating recording medium to a preselected radial position over a previously servowritten area of said rotating recording medium that has one or more previously recorded transitions;

acceleration means for turning off said servo controller signal to said actuator arm and imposing a predetermined angular acceleration on said actuator arm by applying a predetermined amount of current to said VCM; and calibrating means for calibrating a spacing of said tracks in said previously servowritten area, by measuring the amplitudes of said previously recorded transitions at least one time during the passage of said sectors beneath said transducer, and the calibration means further comprising means for measuring a torque constant (K) by applying a current impulse for a predetermined time (t) and measuring the back Electromotive generated from said VCM a recording to said VCM Force (EMF) to determine the torque per unit for said current impulse for said predetermined time (t) and to determine the back Electromotive Force (EMF) per unit of angular velocity of said actuator arm, and if said calibrating of said spacing is outside a predetermined tolerance, then performing:

computing means for computing an adjustment factor based on the values of said torque constant (K), said current impulse for said period of time (t), and said back Electromotive Force (EMF) per unit of angular velocity of said actuator arm; and continuing servowriting means for continuing servowriting new recorded transitions using said adjustment factor on tracks following said previously servowritten area and without first positioning said transducer to a limit stop.

12. An apparatus to determine and correct track spacing during self-servowriting on a rotating recording medium comprising a plurality of sectors containing tracks having track numbers; and a transducer mounted on an actuator arm pivotally coupled to a voice coil motor (VCM), wherein a position of said actuator arm is controlled by a servo controller signal, said apparatus comprising:

self-servowriting means for writing a recorded transition on at least one of said plurality of sectors comprising a series of n burst patterns so that said burst pattern corresponds to a track number; and burst patterns are written in sequence so they correspond to a track number wherein said burst patterns repeat every n tracks;

positioning means for positioning said transducer relative to said rotating recording medium to a preselected radial position over a previously servowritten area of said rotating recording medium that has one or more previously recorded transitions;

measuring means for measuring the average value of current (X) of VCM;

acceleration means turning off said servo controller signal to said actuator arm and imposing a predetermined angular acceleration on said actuator arm by applying a predetermined amount of current (X+I) for an impulse time to said VCM; and measuring means for calibrating a spacing of said tracks in said previously servowritten area, by measuring the amplitudes of said previously recorded transitions at least one time during the passage of said sectors beneath said transducer;

an adjustment factor computed based on the calibration of the position of said transducer;

de-acceleration means for imposing an biasing current (X−I) for said impulse time to said VCM to de-accelerate said actuator arm to nearly zero velocity; and continuing servowriting means for continuing servowriting new recorded transitions using said adjustment factor in an area immediately adjacent to said previously servowritten area.

13. An apparatus to determine and correct track spacing during self-servowriting on a rotating recording medium of claim 12, further comprising:

measuring means for measuring a VCM torque constant (K); and wherein said adjustment factor is computed based on the calibration of the position of said transducer and said VCM torque constant.

14. An apparatus to determine and correct track spacing during self-servowriting on a rotating recording medium of claim 12, further comprising:

means for fitting said calibrating of said transducer along a calibration curve through use of higher order polynomials techniques.

15. An apparatus to determine and correct track spacing during self-servowriting on a rotating recording medium of claim 12, wherein said measuring means further comprising means for measuring a VCM torque constant (K) by applying a current impulse for a predetermined time (t) and measuring the back Electromotive Force (EMF) generated from said VCM to determine the torque per unit for said current impulse for said predetermined time (t) and to determine the back Electromotive Force (EMF) per unit of angular velocity of said actuator arm; and wherein said adjustment factor is computed based on the values of said torque constant (K), said current impulse for said period of time (t), and said back Electromotive Force (EMF) per unit of angular velocity of said actuator arm.

* * * * *

UNITED STATES PATENT AND TRADEMARK OFFICE
CERTIFICATE OF CORRECTION

PATENT NO.    : 6,344,942 B1  
DATED         : February 5, 2002  
INVENTOR(S)   : Edward J. Yarmchuk Page 1 of 1

It is certified that error appears in the above-identified patent and that said Letters Patent is hereby corrected as shown below:

<u>Column 17,</u>
Line 5, from "maid" to -- said --

Signed and Sealed this

Fourth Day of June, 2002

Attest:

Attesting Officer

JAMES E. ROGAN
*Director of the United States Patent and Trademark Office*